UNITED STATES PATENT OFFICE 2,548,685

PHOTOPOLYMERIZATION PROCESS AND COMPOSITIONS

Carrol C. Sachs, North Hollywood, and John Bond, Los Angeles, Calif., assignors to Alexander H. Kerr & Co., Inc., Los Angeles, Calif.

No Drawing. Application December 21, 1946, Serial No. 717,796

24 Claims. (Cl. 204—158)

This invention relates to the photopolymerization of polymerizable ethylenically unsaturated organic compounds, particularly, the polymerization thereof under the influence of light.

It is known that ultraviolet light and some ranges of the visible light are effective as catalysts for photopolymerization reactions; also that polychlorinated organic compounds containing two or more chlorine atoms on the same carbon atom are catalysts for the polymerization in aqueous emulsion of the conjugated diolefines alone or together with minor proportions of vinyl aromatic compounds, such as styrene. These polymerization reactions have evidently been carried out in the dark, i. e. in a bomb or autoclave, since light is not mentioned in the description of the process and because the low boiling points of the diolefines employed precludes operation at atmospheric pressure.

The use of beta substituted naphthalene derivatives and actinic light as catalytic agents has been proposed, as has also the use of vicinal ketaldonyl compounds as photopolymerization catalysts in the presence of actinic light. The use of alpha-carbonyl alcohols in the presence of actinic light as photopolymerization agents has also been suggested.

The photopolymerization of certain ethylenically unsaturated compounds has long been known, but the rate of polymerization has hitherto been such that photopolymerization has not recommended itself as a feasible method for polymerization on a commercial scale largely because of the slowness of the process.

This particular problem has been overcome somewhat by the use of catalysts such as above referred to. However, the use of vicinal ketaldonyls and alpha-carbonyl alcohol compounds in the polymerization of unsaturated monomers does not lend itself where a perfectly colorless material is desired, inasmuch as these particular catalysts either are colored or develop color during the photopolymerization process.

This invention has for its object the improvement in the photopolymerization of a photopolymerizable ethylenically unsaturated organic compound having a methylene (CH$_2$) group attached by a double bond to a carbon, which comprises effecting the photopolymerization of said compound in the presence of a halogen containing compound in one of the following groups. A halogen containing compound is one which contains a halogen atom, which in this case is chlorine, bromine, or iodine. Fluorine, which is a halogen, is excluded from consideration herein because fluorine containing compounds were found not active enough to be practical.

A. A halogen containing compound in which the halogen atom is attached to a carbon atom which is in turn attached to a carbon atom connected by a double bond to another carbon atom.

R—CH=CH—CH$_2$X

R is aliphatic or aromatic or hydrogen
X is chlorine, bromine or iodine

B. A halogen containing compound in which the halogen atom is attached to a carbon atom which is in turn attached to a carbon atom to which is attached an oxygen atom in the case of ketones and aldehydes.

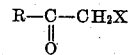

R is aliphatic or aromatic or hydrogen
X is chlorine, bromine, or iodine

C. A halogen containing compound in which the halogen atom is attached to a carbon atom which is in turn attached to an aromatic nucleus as benzene, naphthalene, phenanthranene, etc.

CH$_2$X

X is chlorine, bromine, or iodine.

D. A halogen containing compound in which the halogen atom is attached to an alpha carbon atom of an acid, acid halide, ester, amide or anhydride.

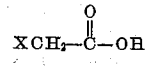

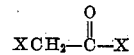

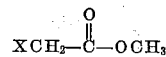

E. Some acid halides have been found to have favorable activity as photopolymerization catalysts in the presence of actinic light.

R=alkyl, aryl

R=alkyl, aryl or X

The above listed groups of compounds in general constitute unexpected improvements over the present day photopolymerization catalysts, such as above mentioned, in that they do not give any color to the ethylenically unsaturated compound which is to be polymerized while the polymerization rate is comparable, and as a result may be used in cases where a perfectly clear or colorless polymer is desired.

The photopolymerizable ethylenically unsaturated compounds of this invention have a methylene ($CH_2$) group attached by a double bond to a carbon. They include the acids, esters, amides, and nitriles of acrylic, alpha-halogen substituted acrylic and alpha-hydrocarbon substituted acrylic acids, i. e., compounds having the structure

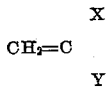

where X is hydrogen, halogen, or hydrocarbon and Y is COOR, $CONH_2$, CN, or —OCOR, and R is hydrogen or hydrocarbon.

The photopolymerization may be according to any of the modes known to the art, e. g., bulk, solution, emulsion, or "granular" types of polymerization.

In the bulk method of polymerization a relatively small amount of one or more of the above mentioned halogenated compounds (about .5%) is dissolved in the chosen readily polymerizable ethylenic compound and the solution is placed in a suitable vessel. The vessel may be constructed of glass to permit the entrance of actinic light or the light source may be suspended within the material to be polymerized. The source of light may be sunlight, mercury vapor lamp, a tungsten bulb, or some similar arrangement to give light either in the range of the ultraviolet, plus visible light, or in the range of certain wave lengths of visible light alone. The rate of polymerization occurs fairly rapidly under relatively mild conditions. However, it varies with the temperature and to obtain bulk castings, free from surface defects, the temperature should be controlled.

In emulsion polymerization the readily polymerizable ethylenic compounds and polymerization catalysts are held in emulsion in water by an emulsifying agent. The emulsion is then irradiated with actinic light and the material precipitates from the solution as it polymerizes.

In the granular process of polymerization, the material to be polymerized containing a small amount of the catalyst is rapidly agitated in an aqueous system containing a small percentage (up to about 3%) of a protective colloid which acts as the granulating agent and causes the material to disperse in the form of small droplets which solidify and precipitate out of the mixture as polymerization proceeds. These granules are readily filtered from the mixture, washed free from occluded colloid and dried.

In the solution method the ethylenic compound and the photopolymerization catalyst are dissolved in a solvent and the light directed upon the solution until the desired extent of polymerization is achieved.

EXAMPLE I

This example illustrates the bulk photopolymerization of methyl methacrylate in the presence of different halogen containing compounds in one of the above groups.

Methyl methacrylate specimens containing 3% of their weight of the photopolymerization catalyst indicated in the table below were placed in glass vessels and exposed to the light from a 250 watt mercury vapor light, operating at a distance of 3½ inches from the specimens. The polymerization was carried out at a temperature of about 30 deg. C. The indicated time represents the period required for the liquid monomer to be converted into a solid (about 60 per cent polymer). For example, the sample which contained alpha-chloromethylnaphthalene solidified in 7 hours whereas a control specimen containing no photopolymerization catalyst did not solidify or appreciably change viscosity after 125 hours' exposure. The following table lists the observed data:

| Activator | Time, in hours |
| --- | --- |
| None (control) | Still fluid after 100 hours exposure. |
| Alpha-chloromethylnapthalene | 7. |
| Phenacyl Bromide | 8½. |
| B-Toluenesulfonyl Chloride | 10. |
| Chloroacetone | 10½. |
| Chloral Hydrate | 11½. |
| Sulfuryl Chloride | 12. |
| Acetyl Chloride | 17. |
| Allyl Chloroformate | 19. |
| Chloroacetyl Chloride | 20. |

EXAMPLE II

This example illustrates the effect of the concentration of the photopolymerization catalyst on the rate of polymerization of methyl methacrylate in bulk at 30 deg. C. A series of methyl methacrylate samples containing .003, .03, .3, and 3.0% of alpha-chloromethylnaphthalene was prepared and placed in glass vessels. The samples were then irradiated with light from a 250 watt mercury vapor lamp, operating at a distance of 3½ inches from the specimens. The specimens were allowed to polymerize to a solid (about 60% polymer).

| Percent Activator (alpha-chloromethylnaphthalene) | Time, in hours |
| --- | --- |
| 3.0 | 7. |
| 0.3 | 9½. |
| 0.03 | 11. |
| 0.003 | 25. |
| None (control) | Still fluid after 100 hours exposure. |

The previous examples illustrate the photopolymerization of methyl methacrylate in the presence of photopolymerization catalysts under various conditions. Other unsaturated monomeric materials may likewise be polymerized alone or in conjunction with other unsaturated monomeric materials:

*Monomers and mixtures of monomers poylmerized*

Methyl methacrylate
Methyl acrylate
Acrylonitrile
50% vinyl acetate and 50% methyl methacrylate
50% methyl methacrylate and 50% methyl acrylate
50% methyl methacrylate and 50% acrylonitrile
50% methyl acrylate and 50% acrylonitrile
50% styrene and 50% acrylonitrile
50% vinyl acetate and 50% acrylonitrile

EXAMPLE III

This example illustrates the preparation of sheet casting by the process of this invention.

A solution of about 1% phenacyl bromide in methyl methacrylate in a glass vessel was irradiated by means of a mercury vapor arc as in Experiment 2 and at a distance of 6 inches until a thin syrup had formed. This syrup was then poured between two sheets of glass plate which were separated by a flexible separator. The sample was then placed on a ground glass plate mounted at an angle of about 5 degrees from the horizontal and pressure uniformly applied on the plates. Irradiation was provided from below by means of a mercury vapor lamp of the type described in Example II at a distance of about 9 inches and was continued at about room temperature until polymerization was practically complete. When the restraining glass plates were removed by soaking in warm water there was obtained a cast sheet of the polymer which was free from visible defects such as bubbles, striations, and discolorations and the like.

EXAMPLE IV

This example illustrates the preparation of a large bulk casting by the practice of this invention.

A solution of methyl methacrylate containing about 1% of alpha-chloromethylnaphthalene was placed in a suitable glass container which was mounted in a fluid for providing a means for controlling the temperature of polymerization. Light from a mercury vapor lamp, as described in Example I, was directed through the bottom of the container at a distance of 6 inches until polymerization appeared to be practically complete. The bulk casting was then baked several hours at about 75 deg. C. to insure complete polymerization. The product thus obtained was practically colorless and was free from defects such as bubbles, striations, etc.

EXAMPLE V

The following example illustrates the improvement effected by this invention in the emulsion photopolymerization of methyl methacrylate.

Twenty parts of an emulsion prepared from 140 parts of methyl methacrylate, 260 parts of distilled water, and 8 parts of an emulsifying agent (the sodium salt of the sulphate of alcohol) was added to each of three Pyrex glass vessels. To two of these containers .15 part of alpha-chloromethylnaphthalene was added. Two of these tubes were exposed at 30 deg. C. to the irradiation of a mercury vapor lamp as described in Example I, at a distance of 5 inches, while the other was kept in the dark at the same temperature. At the end of 80 minutes all the emulsions were broken by the addition of an electrolyte (aluminum sulphate) and the polymers were isolated. The following data contains the data thus observed and shows the beneficial effect of the presence of alpha-chloromethylnaphthalene in the photopolymerization of methyl methacrylate.

| Light | Per Cent Alpha-Chloromethylnaphthalene | Polymer Yield, in per cent |
| --- | --- | --- |
| UV | 0.0 | 11.0 |
| UV | 2.0 | 94.0 |
| None | 2.0 | 0.0 |

EXAMPLE VI

The following example illustrates the beneficial effect of the pressure of alpha-chloromethylnaphthalene on the photopolymerization of methyl methacrylate in solution.

A solution of 100 parts of methyl methacrylate in 200 parts of acetone was divided into two parts. Into one was added one part of alpha-chloromethylnaphthalene. The two solutions were then exposed simultaneously in glass containers to the light from a mercury vapor arc, as described in Example II, at a distance of 6 inches. After irradiation for 12 hours the polymers were precipitated from the solution. The following yields were obtained:

Per cent
Polymerization with alpha-chloromethylnaphthalene _____ 30.5
Polymerization without alpha-chloromethylnaphthalene _____ 1.2

EXAMPLE VII

This example illustrates the application of this invention to the granular photopolymerization of methyl methacrylate.

A mixture of 200 parts of water, 1 part of methyl starch (granulating agent), 100 parts of methyl methacrylate, and 1.5 parts of alpha-chloromethylnaphthalene was placed in a vessel of such construction that its contents could be irradiated by means of a mercury vapor arc as described in Example II at a distance of 3 inches. The mixture was stirred vigorously and was heated under reflux. In 7 hours the polymerization was practically complete, the granular product was washed well and dried, giving an almost quantitative yield of polymer.

The invention is generic to the use of such compounds as described in the previous paragraphs and includes the photointerpolymerization of an ethylenically unsaturated compound having a methylene group attached by a double bond to a carbon, which compound may be photopolymerized either alone or at least in combination with another such compound. Illustrated compounds include acrylic, chloroacrylic, and methacrylic esters, amides, nitriles, e. g., methyl acrylate, methyl chloroacrylate, methyl methacrylate, methacrylamide, methacrylonitrile, acrylonitrile, and vinyl acetate. Alkyl acrylates and methacrylates are preferred because of the rate and satisfactory nature of their polymerization. It has been found that the lower (1 to 4 carbon) alkyl acrylates and methacrylates are preferred.

The invention is also applicable to mixtures which do photopolymerize, for example, certain monomers which do not readily polymerize may be mixed with other monomers which do readily polymerize and a copolymerization of the two materials may be effected. Unsaturated materials which do not polymerize under the action of light alone, or at least in mixture with other photopolymerizable ethylenically unsaturated compounds, are excluded from this invention.

This invention is also applicable to certain mixtures of the individual constituents of which photopolymerize very slowly alone. For example, it is applicable to the copolymerization of simple esters of unsaturated dibasic acids or unsaturated alkyd resins or the polyesters of polyhydric unsaturated polybasic acids with ethylenically unsaturated compounds having a methylene ($CH_2$) group attached by a double bond to a carbon. They include the acids, esters, amides, and nitriles of acrylic, alpha-halogen substituted acrylic and alpha - hydrocarbon substituted acrylic acids (or mixtures of these compounds), i. e., compounds having the structure

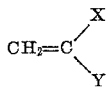

where X is hydrogen, halogen, or hydrocarbon and Y is COOR, CONH$_2$, CN, or —OCOR, and R is hydrogen or hydrocarbon; by subjecting this polymerizable compound to light of wavelengths between 1800–7000 Angstroms, which is activating a photopolymerization catalyst as described in the preceding paragraphs.

An example of a mixture of a polyester of a polyhydric unsaturated polybasic acid with one of the above mentioned ethylenically unsaturated compounds would be one comprised of the following:

1 mole of triethylene glycol
1 mole of maleic anhydride
(Reacted to form the polyester)

An example of a mixture of a simple ester of an unsaturated dibasic acid with an ethylenically unsaturated compound as described above would be.

1 mole of diethylene maleate
1 mole of styrene

The present invention is an improvement in photopolymerization of photopolymerizable materials influenced by radiant energy in the form of light rays, both visible and invisible. The term light as herein used includes wave lengths both in the infrared and in the ultraviolet, and of course wave lengths of all light in the intermediate visible spectrums.

Photopolymerization in the presence of infrared wave lengths is much slower than in the visible or in the ultraviolet light. The most useful and effective light is that having wave lengths between 3200 and 7000 Angstroms, also, as pointed out, wave lengths in the ultraviolet below 3200 Angstroms are effective.

The upper limit of 7000 Angstroms represents the beginning of the infrared band having the less effective wave lengths. 3200 Angstroms is the lower limit of transmission of ordinary glass and since light passing through this material is frequently used in this process, this figure represents a lower preferred limit. Inasmuch as light below 1800 Angstroms will not transmit through quartz, all experiments conducted with artificial light sources using quartz mantles were limited to wave lengths above 1800.

The wave length of light actually utilized in the photopolymerization process depend upon the opacity or transparency of the walls of the container holding the photopolymerizable compound. For example, when ordinary glass is used as a container the light transmitted through the walls and reaching the photopolymerization reaction mixture is largely that containing wave lengths greater than 3200 Angstroms. When tubes or vessels of Pyrex glass are employed the lower limit of light available is in the range of 2850 Angstroms. The limit of actinic rays for methyl methacrylate itself is about 3500 Angstroms, so that in the photopolymerization of methyl methacrylate monomer, light having wave lengths greater than 3500 Angstroms should be used or is preferable. However, this does not exclude the fact that lower or higher wave lengths of actinic light are effective in the polymerization.

A convenient source of light of proper intensity is the mercury vapor arc which emits light in the ultraviolet as well as in the visible range. Certain types of tungsten bulbs of suitable intensity may be used, for example, a 1500 watt, 110 volt lamp.

The temperature of polymerization is dependent on the monomer being polymerized and the type of process employed. The usual range is from room temperature to about 100 deg. C. However, it has been found that if the material to be polymerized is kept at a low temperature, for example, 5 to 10 deg. C., a larger, more bubble-free, casting may be prepared.

The concentration of the catalyst used in the solution is important in that it appreciably affects the rate of polymerization as shown in Example 2. Furthermore, the photopolymerization catalyst need not be employed alone but may be used in conjunction with other catalysts, as photopolymerization catalysts or heat catalysts, to give a faster cure. In the case of heat catalyst, benzoyl peroxide, lauroyl peroxide, or other suitable peroxide, may be used. Therefore, in certain cases, as granular and emulsion systems, it is often desirable to use both a photopolymerization catalyst and a peroxide.

The molecular weight of the polymer is also appreciably dependent on the concentration of the photopolymerization catalyst in the system inasmuch as the rate of polymerization is affected by the molecular weight.

The nature of gaseous atmosphere above the sample is of importance. Experiments have indicated that an atmosphere of oxygen inhibits the polymerization to a large extent whereas an atmosphere of nitrogen gives the greatest amount of polymerization within a definite period of time. Consequently, although air itself is usually employed as the atmosphere above the sample and ordinarily is quite satisfactory, polymerization will proceed at a greater rate when the oxygen in the air is at least partially removed.

In emulsion polymerization of certain materials it is desirable to operate within certain pH ranges. In such cases the original emulsifying systems may be adjusted to this pH by the addition of bases or acids.

The process of this invention may be used to adhere the surfaces of two objects, at least one of which is transparent, by placing a small amount of photopolymerization monomeric unsaturated material containing a photopolymerization catalyst as described in this application and passing light of the appropriate wave length through the transparent member, thus causing polymerization of the monomer and effecting a bond between the surfaces.

The nature of the products obtained by the practice of this invention is entirely dependent upon the materials which are polymerized and consequently vary with their properties. The products may be used in any way that polymers regularly obtained are used consequently no attempt is made to limit the use of the materials.

The above description and example are intended to be illustrative only. Any modification of and variation therefrom which conforms to the spirit of the invention is intended to be included within the scope of the claims.

We claim:

1. A process of photopolymerization, which comprises irradiating with actinically active light a catalytically photopolymerizable ethylenically unsaturated resinifiable compound having a methylene group (CH$_2$) attached by a double bond to a carbon containing dispersed therein a minor proportion of a photopolymerization catalyst consisting of a compound having the general formula

where R consists solely of hydrogen and carbon atoms and is chosen from the group consisting of aromatic, alkyl and alkene radicals and $R_1$ is chosen from the group consisting of halogen and halogenated methyl radicals, wherein the halogen is chosen from the group consisting of chlorine, bromine, and iodine, and continuing said irradiation for a period of time to cause photopolymerization of said resinifiable compound.

2. A process of photopolymerization, which comprises irradiating with actinically active light a catalytically photopolymerizable ethylenically unsaturated resinifiable compound having a methylene group ($CH_2$) attached by a double bond to a carbon containing dispersed therein a minor proportion of phenacyl bromide.

3. A process of photopolymerization, which comprises irradiating with actinically active light a catalytically photopolymerizable ethylenically unsaturated resinifiable compound having a methylene group ($CH_2$) attached by a double bond to a carbon containing dispersed therein a minor proportion of acetyl chloride.

4. A process for photopolymerization of methyl methacrylate, which comprises irradiating with actinically active light methyl methacrylate containing a minor proportion of a photopolymerization catalyst consisting of a compound having the general formula

where R consists solely of hydrogen and carbon atoms and is chosen from the group consisting of aromatic, alkyl and alkene radicals and $R_1$ is chosen from the group consisting of halogen and halogenated methyl radicals wherein the halogen is chosen from the group consisting of chlorine, bromine, and iodine, and continuing said irradiation for a period of time to photopolymerize said methyl methacrylate.

5. A process for photopolymerization of methyl methacrylate, which comprises irradiating with actinically active light methyl methacrylate containing a minor proportion of phenacyl bromide and continuing said irradiation for a period of time to photopolymerize said methyl methacrylate.

6. A process for photopolymerization of methyl methacrylate, which comprises irradiating with actinically active light methyl methacrylate containing a minor proportion of acetyl chloride and continuing said irradiation for a period of time to photopolymerize said methyl methacrylate.

7. A process of photopolymerization, which comprises irradiating with actinically active light a catalytically photopolymerizable ethylenically unsaturated resinifiable compound, having a methylene group ($CH_2$) attached by a double bond to a carbon containing dispersed therein from .003% to 3% of a photopolymerization catalyst consisting of a compound having the general formula

where R consists solely of hydrogen and carbon atoms and is chosen from the group consisting of aromatic, alkyl and alkene radicals and $R_1$ is chosen from the group consisting of halogen and halogenated methyl radicals, wherein the halogen is chosen from the group consisting of chlorine, bromine, and iodine, and continuing said irradiation for a period of time to cause photopolymerization of said resinifiable compound.

8. A process of photopolymerization, which comprises irradiating with actinically active light a catalytically photopolymerizable ethylenically unsaturated resinifiable compound having a methylene group ($CH_2$) attached by a double bond to a carbon containing dispersed therein from .003% to 3% of phenacyl bromide, and continuing said irradiation for a period of time to cause photopolymerization of said resinifiable compound.

9. A process of photopolymerization, which comprises irradiating with actinically active light a catalytically photopolymerizable ethylenically unsaturated resinifiable compound having a methylene group ($CH_2$) attached by a double bond to a carbon containing dispersed therein from .003% to 3% of acetyl chloride, and continuing said irradiation for a period of time to cause photopolymerization of said resinifiable compound.

10. A process for photopolymerization of methyl methacrylate, which comprises irradiating with actinically active light methyl methacrylate containing from .003% to 3% of a photopolymerization catalyst consisting of a compound having the general formula

where R consists solely of hydrogen and carbon atoms and is chosen from the group consisting of aromatic, alkyl and alkene radicals, and $R_1$ is chosen from the group consisting of halogen and halogenated methyl radicals, wherein the halogen is chosen from the group consisting of chlorine, bromine, and iodine, and continuing said irradiation for a period of time to photopolymerize said methyl methacrylate.

11. A process for photopolymerization of methyl methacrylate, which comprises irradiating with actinically active light methyl methacrylate containing from .003% to 3% phenacyl bromide, and continuing said irradiation for a period of time to photopolymerize said methyl methacrylate.

12. A process for photopolymerization of methyl methacrylate, which comprises irradiating with actinically active light methyl methacrylate containing from .003% to 3% of acetyl chloride and continuing said irradiation for a period of time to photopolymerize said methyl methacrylate.

13. A new photopolymerizable resinophoric composition of matter consisting essentially of a catalytically photopolymerizable ethylenically unsaturated resinifiable compound, having a methylene group ($CH_2$) attached by a double bond to a carbon and containing dispersed therein a minor proportion of a photopolymerization catalyst consisting of a compound having the general formula

where R consists solely of hydrogen and carbon atoms and is chosen from the group consisting of the aromatic, alkyl, and alkene radicals, and $R_1$ is chosen from the group consisting of halogen and halogenated methyl radicals wherein halogen is chosen from the group consisting of chlorine, bromine, and iodine.

14. A new photopolymerizable resinophoric composition according to claim 13 wherein the photopolymerizable compound is methyl methacrylate.

15. A new photopolymerizable resinophoric composition of matter consisting essentially of a catalytically photopolymerizable ethylenically unsaturated resinifiable compound, having a methylene group ($CH_2$) attached by a double bond to a carbon and containing dispersed therein from .003% to 3% of a photopolymerization catalyst consisting of a compound having the general formula

where R consists solely of hydrogen and carbon atoms and is chosen from the group consisting of the aromatic, alkyl and alkene radicals and $R_1$ is chosen from the group consisting of halogen and halogenated methyl radicals wherein halogen is chosen from the group consisting of chlorine, bromine, and iodine.

16. A composition according to claim 15 wherein the photopolymerizable compound is methyl methacrylate.

17. A new photopolymerizable resinophoric composition of matter consisting of catalytically photopolymerizable ethylenically unsaturated resinifiable compound, having a methylene group ($CH_2$) attached by a double bond to a carbon, and containing dispersed therein from .003% to 3% of phenacyl bromide.

18. A composition according to claim 17 wherein the photopolymerizable compound is methyl methacrylate.

19. A new photopolymerizable resinophoric composition of matter consisting of a catalytically photopolymerizable ethylenically unsaturated resinifiable compound, having a methylene group ($CH_2$) attached by a double bond to a carbon, and containing dispersed therein from .003% to 3% of acetyl chloride.

20. A composition according to claim 19 wherein the photopolymerizable compound is methyl methacrylate.

21. A new photopolymerizable resinophoric composition of matter, consisting of a catalytically photopolymerizable ethylenically unsaturated resinifiable compound, having a methylene group ($CH_2$) attached by a double bond to a carbon, and containing dispersed therein a minor proportion of phenacyl bromide.

22. A new photopolymerizable resinophoric composition of matter according to claim 21 in which the photopolymerizable compound is methyl methacrylate.

23. A new photopolymerizable resinophoric composition of matter, consisting of a catalytically photopolymerizable ethylenically unsaturated resinifiable compound, having a methylene group ($CH_2$) attached by a double bond to a carbon, and containing dispersed therein a minor proportion of acetyl chloride.

24. A photopolymerizable resinophoric composition of matter according to claim 23 in which the photopolymerizable compound is methyl methacrylate.

CARROL C. SACHS.
JOHN BOND.

REFERENCES CITED

The following references are of record in the file of this patent:

UNITED STATES PATENTS

| Number | Name | Date |
|---|---|---|
| 1,920,403 | Klatte et al. | Aug. 1, 1933 |
| 1,967,860 | Carothers et al. | July 24, 1934 |
| 1,975,959 | Lawson et al. | Oct. 9, 1934 |
| 2,047,398 | Voss et al. | July 14, 1936 |
| 2,160,943 | Britton et al. | June 6, 1939 |
| 2,212,786 | McQueen | Aug. 27, 1940 |
| 2,273,891 | Pollack et al. | Feb. 24, 1942 |
| 2,367,661 | Agre | Jan. 23, 1945 |
| 2,386,448 | Dreisbach | Oct. 9, 1945 |